United States Patent
Swietojanski et al.

(10) Patent No.: US 11,806,862 B2
(45) Date of Patent: Nov. 7, 2023

(54) ROBOTS, METHODS, COMPUTER PROGRAMS, COMPUTER-READABLE MEDIA, ARRAYS OF MICROPHONES AND CONTROLLERS

(71) Applicant: Emotech Ltd., London (GB)

(72) Inventors: Pawel Swietojanski, London (GB); Tomasz Franciszek Wierzchowski, London (GB); Pedro Antonio Martinez Mediano, London (GB)

(73) Assignee: Emotech Ltd., London (GB)

( * ) Notice: Subject to any disclaimer, the term of this patent is extended or adjusted under 35 U.S.C. 154(b) by 945 days.

(21) Appl. No.: 16/784,583

(22) Filed: Feb. 7, 2020

(65) Prior Publication Data

US 2020/0246977 A1    Aug. 6, 2020

Related U.S. Application Data

(63) Continuation of application No. PCT/GB2018/052272, filed on Aug. 9, 2018.

(30) Foreign Application Priority Data

Aug. 9, 2017   (GB) ..................................... 1712791

(51) Int. Cl.
    *B25J 9/16*       (2006.01)
    *B25J 13/00*      (2006.01)

(52) U.S. Cl.
    CPC ........... *B25J 13/003* (2013.01); *B25J 9/1697* (2013.01)

(58) Field of Classification Search
    USPC ................................................. 700/245–264
    See application file for complete search history.

(56) References Cited

U.S. PATENT DOCUMENTS

| | | | | |
|---|---|---|---|---|
| 6,584,376 | B1 * | 6/2003 | Van Kommer | G05D 1/0022 |
| | | | | 379/90.01 |
| 8,380,349 | B1 * | 2/2013 | Hickman | H04L 67/303 |
| | | | | 701/25 |
| 9,729,821 | B1 * | 8/2017 | Fineberg | G06F 3/167 |
| 9,892,732 | B1 * | 2/2018 | Tian | G10L 15/00 |
| 9,940,949 | B1 * | 4/2018 | Vitaladevuni | G10L 25/78 |

(Continued)

FOREIGN PATENT DOCUMENTS

JP       2005250233 A     9/2005

OTHER PUBLICATIONS

International Search Report and Written Opinion dated Nov. 22, 2018 for PCT Application No. PCT/GB2018/052272.

(Continued)

*Primary Examiner* — Jonathan L Sample
(74) *Attorney, Agent, or Firm* — EIP US LLP (57) ABSTRACT

A robot obtains image data representative of an environment comprising a first region and a second region. A microphone receives sound from the environment. The robot determines, using the image data and audio data derived based on the received sound, whether the sound is received from the first region, and outputs a control signal for controlling the robot based on the audio data. Sounds received from the first region are processed as voice commands on the basis that one of the first region and the second region comprises a predetermined type of inanimate object. Sounds received from the second region are processed in a different manner.

20 Claims, 5 Drawing Sheets

(56) References Cited

U.S. PATENT DOCUMENTS

| | | | |
|---|---|---|---|
| 9,977,965 B1* | 5/2018 | Parikh | B25J 9/1697 |
| 10,403,276 B2* | 9/2019 | SaganeGowda | G10L 15/22 |
| 10,427,306 B1* | 10/2019 | Quinlan | B25J 11/008 |
| 10,580,405 B1* | 3/2020 | Wang | G06F 3/167 |
| 2003/0055532 A1* | 3/2003 | Sakagami | G06N 3/008 |
| | | | 700/245 |
| 2005/0043956 A1* | 2/2005 | Aoyama | G10L 15/22 |
| | | | 704/E15.04 |
| 2006/0126918 A1* | 6/2006 | Oohashi | G05D 1/0251 |
| | | | 382/153 |
| 2006/0280312 A1* | 12/2006 | Mao | G10L 21/0208 |
| | | | 704/231 |
| 2007/0192910 A1* | 8/2007 | Vu | B25J 19/06 |
| | | | 901/17 |
| 2007/0233321 A1* | 10/2007 | Suzuki | G05D 1/0251 |
| | | | 700/245 |
| 2010/0034397 A1* | 2/2010 | Nakadai | G01S 3/8006 |
| | | | 381/58 |
| 2011/0161076 A1* | 6/2011 | Davis | G10L 15/22 |
| | | | 704/E15.001 |
| 2013/0035790 A1* | 2/2013 | Olivier, III | G05D 1/0246 |
| | | | 901/1 |
| 2014/0200714 A1* | 7/2014 | Kawamoto | B25J 9/1664 |
| | | | 901/1 |
| 2015/0032260 A1* | 1/2015 | Yoon | A47L 9/2857 |
| | | | 700/257 |
| 2015/0052703 A1* | 2/2015 | Lee | G05D 1/0255 |
| | | | 701/28 |
| 2015/0283701 A1* | 10/2015 | Izhikevich | G06N 3/008 |
| | | | 700/250 |
| 2016/0059418 A1* | 3/2016 | Nakamura | G05D 1/0274 |
| | | | 901/1 |
| 2016/0151917 A1* | 6/2016 | Faridi | B25J 11/0015 |
| | | | 700/259 |
| 2016/0188977 A1* | 6/2016 | Kearns | G06V 40/172 |
| | | | 348/113 |
| 2016/0193732 A1* | 7/2016 | Breazeal | B25J 11/0005 |
| | | | 700/258 |
| 2017/0162195 A1* | 6/2017 | Umesawa | G10L 15/22 |
| 2017/0206064 A1* | 7/2017 | Breazeal | B25J 11/0005 |
| 2017/0242478 A1* | 8/2017 | Ma | G03B 21/28 |
| 2017/0351485 A1* | 12/2017 | Kohler | G06F 3/165 |
| 2017/0352351 A1* | 12/2017 | Kimura | B25J 13/089 |
| 2017/0361468 A1* | 12/2017 | Cheuvront | A47L 9/2857 |
| 2018/0047394 A1* | 2/2018 | Tian | G10L 15/24 |
| 2018/0217806 A1* | 8/2018 | Jang | G06F 3/167 |
| 2018/0232571 A1* | 8/2018 | Bathiche | G06F 3/167 |
| 2018/0233132 A1* | 8/2018 | Herold | G10L 15/1822 |
| 2018/0233142 A1* | 8/2018 | Koishida | H04N 7/181 |
| 2018/0246512 A1* | 8/2018 | Martinson | G06V 20/10 |
| 2020/0412772 A1* | 12/2020 | Nesta | G06F 3/013 |

OTHER PUBLICATIONS

GB Search Report dated Feb. 2, 2018 for Application No. GB1712791.1.

* cited by examiner

ROBOTS, METHODS, COMPUTER PROGRAMS, COMPUTER-READABLE MEDIA, ARRAYS OF MICROPHONES AND CONTROLLERS

CROSS-REFERENCE TO RELATED APPLICATIONS

This application is a continuation of International Application No. PCT/GB2018/052272, filed Aug. 9, 2018 which claims priority to GB Application No. 1712791.1, filed Aug. 9, 2017, under 35 U.S.C. § 119(a). Each of the above-referenced patent applications is incorporated by reference in its entirety.

BACKGROUND OF THE INVENTION

Technical Field

The present invention relates to robots, methods, computer programs, computer-readable media, arrays of microphones and controllers.

Description of the Related Technology

Robots are becoming more prevalent in society and are being provided with increased functionality. Robots may, for example, be controlled via voice commands issued by users. Voice commands can be interpreted by the robot and used as a basis for performing an action, such as generating an output or interacting with a user. Some known systems process voice commands based on the presence and/or location of users within an environment around the robot. Such known systems, and other known systems, can however be relatively complex to implement and/or can suffer from inaccurate processing of voice commands. Additionally, processing of voice commands in some known systems can be a processor-intensive task involving a relatively high level of power consumption.

SUMMARY

According to a first aspect of the present invention, there is provided a robot comprising: an input component configured to obtain image data representative of an environment comprising a first and a second region; a microphone configured to receive sound from the environment; and a controller configured to: determine, using the image data and audio data derived based on the received sound, whether the sound is received from the first region; and output, in response to the controller determining that the sound is received from the first region, a control signal for controlling the robot, the control signal being based on the audio data, wherein the controller is arranged to process sounds received from the first region as voice commands on the basis that one of the first region and the second region comprises a predetermined type of inanimate object, and is arranged to process sounds received from the second region in a different manner.

According to a second aspect of the present invention, there is provided a method of controlling a robot, the robot comprising an input component, a microphone and a controller, the method comprising: obtaining, by the input component, image data representative of an environment comprising a first region and a second region; outputting, by the input component, the image data for processing by the controller; receiving, by the microphone, sound from the environment; outputting, by the microphone, audio data based on the received sound for processing by the controller; and in response to the controller determining, using the image data and the audio data, that the sound is received from the first region, outputting, by the controller, a control signal for controlling the robot, the control signal being based on the audio data, wherein the controller is arranged to process sounds received from the first region as voice commands on the basis that one of the first region and the second region comprises a predetermined type of inanimate object, and is arranged to process sounds received from the second region in a different manner.

According to a third aspect of the present invention, there is provided a computer program comprising instructions which, when executed, cause an apparatus to perform a method of controlling a robot, the robot comprising an input component, a microphone and a controller, the method comprising: obtaining, by the input component, image data representative of an environment comprising a first region and a second region; outputting, by the input component, the image data for processing by the controller; receiving, by the microphone, sound from the environment; outputting, by the microphone, audio data based on the received sound for processing by the controller; and in response to the controller determining, using the image data and the audio data, that the sound is received from the first region, outputting, by the controller, a control signal for controlling the robot, the control signal being based on the audio data, wherein the controller is arranged to process sounds received from the first region as voice commands on the basis that one of the first region and the second region comprises a predetermined type of inanimate object, and is arranged to process sounds received from the second region in a different manner.

According to a fourth aspect of the present invention, there is provided a computer-readable medium comprising a computer program comprising instructions which, when executed, cause an apparatus to perform a method of controlling a robot, the robot comprising an input component, a microphone and a controller, the method comprising: obtaining, by the input component, image data representative of an environment comprising a first region and a second region; outputting, by the input component, the image data for processing by the controller; receiving, by the microphone, sound from the environment; outputting, by the microphone, audio data based on the received sound for processing by the controller; and in response to the controller determining, using the image data and the audio data, that the sound is received from the first region, outputting, by the controller, a control signal for controlling the robot, the control signal being based on the audio data, wherein the controller is arranged to process sounds received from the first region as voice commands on the basis that one of the first region and the second region comprises a predetermined type of inanimate object, and is arranged to process sounds received from the second region in a different manner.

According to a fifth aspect of the present invention, there is provided a robot comprising: a camera configured to capture an image of an environment in which the robot is located; a microphone configured to receive a sound from the environment; and a controller configured to: identify, based on the captured image, a first region of the environment and a second region of the environment, the likelihood of voice commands being issued from the first region being higher than the likelihood of voice commands being issued from the second region; and send a control signal to control an output component of the robot in response to the controller determining that the sound is received from the first region, wherein at least one of the first region and the second region is identified based on a type of inanimate object located in one of the first region and the second region.

According to a sixth aspect of the present invention, there is provided a method of controlling a robot, the method comprising: identifying a characteristic of an inanimate object in an environment based on a captured image of the environment; defining, based on the identified characteristic, a first region of the environment and a second region of the environment, one of the first region and the second region comprising the inanimate object; receiving a sound from the environment; and in response to determining that the sound is received from the first region: interpreting the sound as a voice command; and processing the voice command to generate a control signal for controlling the robot.

According to a seventh aspect of the present invention, there is provided an array of microphones configured to process acoustic signals issuing from a first region in an environment differently to acoustic signals issuing from a second region in the environment on the basis that at least one of the first and the second region comprises a predetermined type of inanimate object recognised using a captured visual representation of the environment.

According to an eighth aspect of the present invention, there is provided a robot configured to: obtain a visual representation of a scene in which the robot is located, the scene comprising a fixture of a predetermined type; receive an acoustic signal; determine a direction of arrival of the acoustic signal; process, on the basis that the fixture is located within a first region of the scene, the acoustic signal as a voice command in response to the determined direction of arrival being indicative of the acoustic signal originating from the first region wherein acoustic signals originating from a second region of the scene are processed in a different manner; and generate a control signal to control the robot based on the processed acoustic signal.

According to a ninth aspect of the present invention, there is provided a controller configured to: receive image data representative of an environment comprising a first region and a second region; receive audio data derived based on sound received from the environment; determine, using the image data and the audio data, whether the sound is received from the first region; and output, in response to the controller determining that the sound is received from the first region, a control signal for controlling operation of a robot, the control signal being based on the audio data, wherein the controller is arranged to process sounds received from the first region as voice commands on the basis that one of the first region and the second region comprises a predetermined type of inanimate object, and is arranged to process sounds received from the second region in a different manner.

According to a tenth aspect of the present invention, there is provided a robot comprising: an input component configured to obtain image data representative of an environment comprising a first and a second region; a microphone configured to receive sound from the environment; and a controller configured to: determine, using the image data and audio data derived based on the received sound, whether the sound is received from the first region; and output, in response to the controller determining that the sound is received from the first region, a control signal for controlling the robot, the control signal being based on the audio data, wherein the controller is arranged to process sounds received from the first region as voice commands on the basis that the first region comprises a predetermined type of inanimate object, and is arranged to process sounds received from the second region in a different manner.

According to an eleventh aspect of the present invention, there is provided a method of controlling a robot, the robot comprising an input component, a microphone and a controller, the method comprising: obtaining, by the input component, image data representative of an environment comprising a first region and a second region; outputting, by the input component, the image data for processing by the controller; receiving, by the microphone, sound from the environment; outputting, by the microphone, audio data based on the received sound for processing by the controller; and in response to the controller determining, using the image data and the audio data, that the sound is received from the first region, outputting, by the controller, a control signal for controlling the robot, the control signal being based on the audio data, wherein the controller is arranged to process sounds received from the first region as voice commands on the basis that the first region comprises a predetermined type of inanimate object, and is arranged to process sounds received from the second region in a different manner.

Further features and advantages will become apparent from the following description, given by way of example only, which is made with reference to the accompanying drawings.

DETAILED DESCRIPTION OF CERTAIN INVENTIVE EMBODIMENTS

Examples described herein facilitate more accurate and efficient processing of voice commands by a robot. In particular, examples described herein enable a robot to distinguish voice commands from other sounds. The ability to distinguish voice commands from other sounds facilitates more accurate interpretation of such voice commands. Accurate interpretation of voice commands enables the robot to perform one or more functions or behave based on such voice commands more reliably. Distinguishing voice commands from other sounds also improves an efficiency of the robot because sounds other than voice commands are not processed as voice commands. An amount of computing resources, processing and/or time spent on processing some sounds as voice commands, when such sounds are unlikely to be voice commands, is reduced compared to known systems, in examples described herein.

Examples described herein enable voice commands to be processed based on one or more inanimate objects, for example items of furniture, in an environment. The inanimate object(s) are used to determine whether or not a particular region in the environment is a plausible source of voice commands. Processing sounds as voice commands based on an analysis of inanimate objects can be more efficient than processing sounds as voice commands based on tracking human users within the environment, as analysis of the inanimate objects may be performed less frequently than corresponding analysis of the users. Image data representative of the environment, such as a captured visual image of the environment, may be obtained in order to identify inanimate objects in the environment. Such image data may be obtained more infrequently than would be the case for image data used in user tracking, which may, for example, involve image data being acquired and analysed in real time. By reducing the frequency of data acquisition, power consumption of the robot and/or an amount of processing may be reduced compared to known systems. Improved energy credentials may be particularly effective in battery-powered devices.

Figure 1:
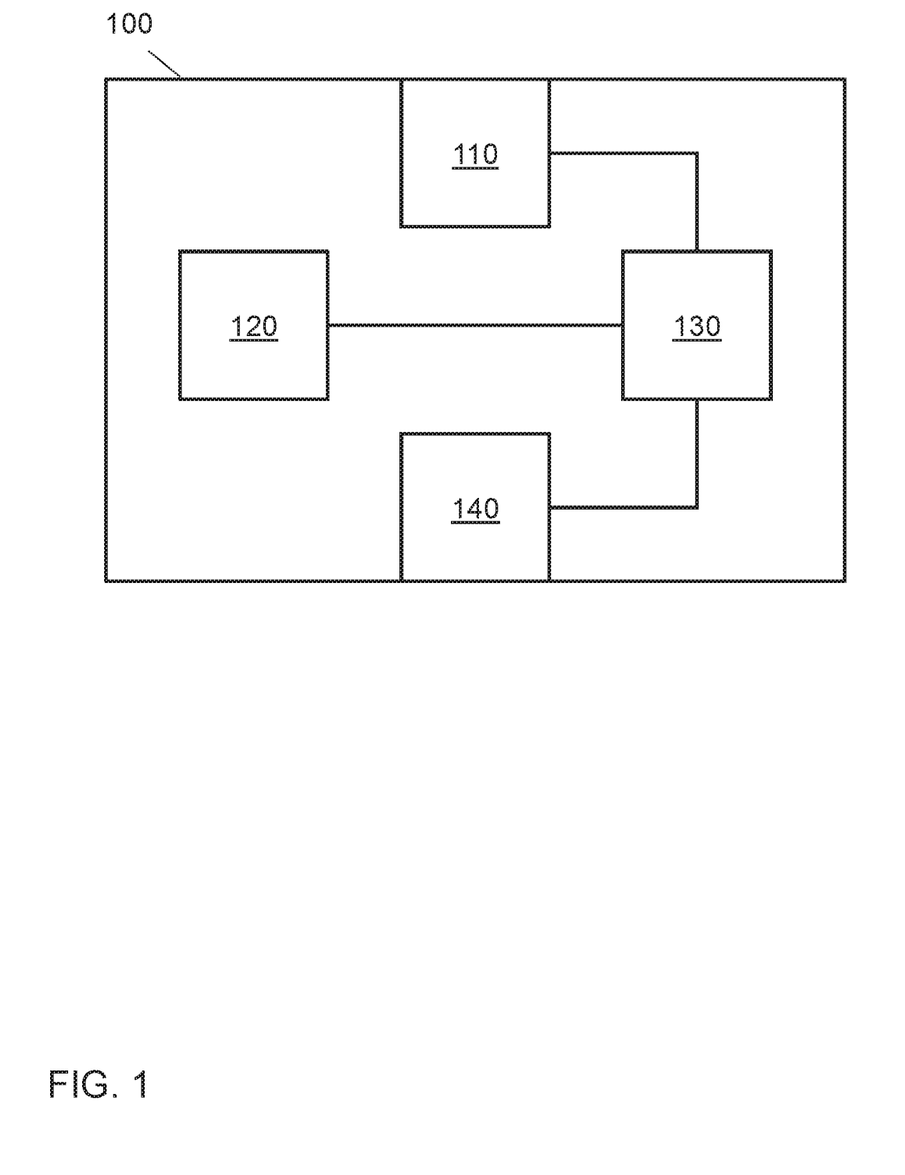
FIG. 1 shows a schematic block diagram of an example of a robot in accordance with an embodiment of the present invention.

Referring to FIG. 1, there is shown schematically an example of a device 100. For convenience and brevity, in the specific examples described in more detail below, the device 100 is typically a robot. A robot may be considered to be a guided agent. A robot may be guided by one or more computer programs and/or electronic circuitry. A robot may be guided by an external control device or the control may be embedded within the robot. A robot may be configured to interact with humans and/or an environment. A robot may or may not be configured to move. It will be understood however that the device 100 may be of a different type. For example, the device 100 may be a loudspeaker such as a smart speaker. A smart speaker is a type of loudspeaker having functionality beyond audio playback. For example, a smart speaker may be configured to initiate telephone calls, interact with users, access one or more data communications networks, or control other devices. A robot may be arranged to perform some or all of the functionality of a smart speaker. The device 100 may be another type of computing device, for example a smart device or a mobile device. A robot may be considered to be a smart device. An example of a smart device is a smart home device, otherwise referred to as a home automation device. A smart home device may be arranged to control aspects of an environment including, but not limited to, lighting, heating, ventilation, telecommunications systems and entertainment systems. A robot as described in the examples below may be arranged to perform some or all of the functionality of a smart home device.

The robot 100 may be an autonomous robot. An autonomous robot may be considered to be a robot that performs functions with a relatively high degree of autonomy or independence compared to non-autonomous robots.

The robot 100 may be a social robot. A social robot may be considered to be an autonomous robot that interacts with one or more other entities based on social behaviours and/or social rules associated with its role. Examples of such entities include, but are not limited to, users or other agents.

The robot 100 comprises an input component 110. The input component 110 is a component of the robot 100 that is arranged to obtain one or more inputs, for example in the form of input data, signaling and/or stimulus. The input component 110 is configured to obtain image data representative of an environment. The environment may be the environment in which the robot 100 is presently located, namely the surroundings of the robot 100. In some examples, the environment is an interior (or 'indoor') environment. For example, the environment may be a room such as a living room, a bedroom, a kitchen, a hotel room or an office. In some examples, the environment comprises more than one room. In some examples, the environment is an exterior (or 'outdoor') environment. For example, the environment may be a garden.

The input component 110 may comprise an interface. The interface may be between the robot 100 and the environment. An interface comprises a boundary via which data can be passed or exchanged in one or both directions. In some examples, the input component 110 comprises an input device. An input device comprises a piece of hardware operable to provide the robot 100 with data and/or stimulus. The input device may comprise an image sensor. An example of an image sensor is a photoelectric sensor. An image sensor may comprise a charge-coupled device (CCD) or a complementary metal-oxide-semiconductor (CMOS). An image sensor may be arranged to detect electromagnetic radiation from the environment. The detected electromagnetic radiation may comprise visible light and/or infrared. The image sensor may be configured to convert such detected radiation into image data, for example in the form of an electrical signal. An example of an input device is a camera. Another example of an input device is a proximity sensor. A proximity sensor is arranged to emit electromagnetic radiation into the environment and to detect changes in a return signal due to objects in the environment, enabling those objects to be detected. An example of electromagnetic radiation emitted by the proximity sensor is infrared. The image data obtained by the input component 110 may comprise an indication of such detected objects. For example, the image data may include metadata to indicate the detected objects for processing by an object recognition engine. A proximity sensor may comprise a capacitive sensor, a photoelectric sensor or an inductive sensor. A further example of an input device is a depth sensor. A depth sensor may be configured to project a pattern of infrared radiation, such as a dot pattern, into the environment, and capture an image or video of the pattern using an infrared camera in order to obtain a depth map of the environment. The image data obtained by the input component 110 may comprise such a depth map. In some examples, the input component 110 comprises a plurality of input devices. For example, the input component 110 may comprise both a camera and a proximity sensor. A camera may provide an image with a relatively large amount visual of detail. A proximity sensor may provide less visual detail than a camera, but can provide useful information on distances of objects from the robot 100 that may otherwise involve capturing an image from multiple angles.

In some examples, the input component 110 comprises a software component. The software component may comprise one or more programs, functions, applications and/or instructions arranged to enable the robot 100 to receive data.

In some examples, the input component 110 comprises a network interface. The network interface may enable the robot 100 to transmit and/or receive data via one or more data communications networks. Examples of data communications networks include, but are not limited to, the Internet, a Local Area Network (LAN) and a wide area network (WAN). The network interface may be arranged to enable the robot 100 to receive data wirelessly, for example via a Bluetooth® or Wireless LAN (WLAN) connection. The image data representative of the environment may be received by the network interface. As such, the image data could represent an environment in which the robot 100 is not presently located. In some examples, the image data is based on a virtual or artificial environment. As such, a camera or image sensor may not be used to obtain the image data. For example, an artificial environment may be generated by a computer, and a representation of that environment may be provided to the robot 100. In some examples, the image data is based on an environment whose image is captured by an image capture device before the robot 100 is moved to or located in the environment.

The image data may be considered to be an auxiliary sensory input. In some examples, the image data is generated by a camera in response to the camera capturing an image of the environment. In some examples, the image data obtained by the input component 110 represents a 360 degree spatial map of the environment. Such image data may be generated by obtaining multiple representations of the environment from different viewing angles or perspectives. Image data representing a 360 degree spatial map of the environment may be obtained by causing at least part of the robot 100 to rotate such that an image sensor obtains image data from multiple angles. For example, a part of the robot 100 may rotate around 360 degrees to enable the image sensor to capture the image data of the environment from different perspectives. Images of the environment from the different perspectives may be stitched together digitally to form a 360 degree map of the environment. Therefore, a 360 degree spatial map of the environment may be obtained without multiple cameras positioned at different locations being used. By capturing the image data from different angles, distances from the robot 100 to different objects may also be measured, enabling a more accurate understanding of the environment compared with a case in which image data is only captured from a single perspective. In some examples, the image data obtained by the input component 110 comprises a 3D representation of the environment. In some examples, image data representing a 360 degree spatial map of the environment is obtained without movement of the robot 100. For example, a fish-eye camera may be used to obtain such image data. The fish-eye camera may be mounted on the robot 100 or be separate from the robot 100.

The environment comprises a first and a second region. The likelihood of voice commands being issued from the first region is higher than the likelihood of voice commands being issued from the second region. At least one of the first region and the second region may be defined on the basis that one of the first region and the second region comprises a predetermined type of inanimate object, as described in more detail below. In some examples, the environment comprises one or more further regions. If the image data is a 2D representation of a 3D environment, a region may be a 2D area in the 2D representation that corresponds to a 3D volume in the 3D environment. If the image data is a 3D representation of a 3D environment, a region may be a 3D volume in the 3D environment. A region may be a regular shape. The shape of a region may be a 2D shape, for example a square or a circle. The shape of a region may be a 3D shape, for example a cube or a sphere. In some examples, a region has an irregular shape. Such an irregular shape may be based on the shape of an inanimate object in the region. A region may fully encompass at least one inanimate object. A region may include a zone around at least one inanimate object, where voice commands are likely to be issued from the zone. The nature of the zone may depend on the inanimate object(s) in the zone.

The robot 100 further comprises a microphone 120. The microphone 120 may be an omnidirectional microphone. An omnidirectional microphone is a microphone that has a similar sensitivity to sounds arriving at the microphone from different directions. In some examples, the microphone 120 has a non-uniform directionality, for example the microphone 120 may be more sensitive to sounds arriving from some directions than sounds arriving from other directions. In some examples, the robot 100 comprises an array of microphones. An array of microphones may be an arrangement of multiple microphones operating in tandem. The array of microphones may comprise a plurality of microphones that are arranged about a perimeter of the robot 100. In some examples, the array of microphones comprises a central microphone arranged inside the perimeter of the robot 100. The array of microphones may include the microphone 120.

The microphone 120 is configured to receive a sound from the environment. A sound is an acoustic signal. The microphone 120 may convert the received sound into an electrical signal. The electrical signal may be transmitted by the microphone 120, e.g. via an electrical wire, cable or other type of connection. The electrical signal may represent and/or be useable to derive audio data indicative of one or more characteristics of the received sound.

The robot 100 further comprises a controller 130. The controller 130 may be a processor. The controller 130 can include a microprocessor, microcontroller, processor module or subsystem, programmable integrated circuit, programmable gate array, or another control or computing device.

The controller 130 is communicatively coupled to the input component 110 and to the microphone 120. The controller 130 may be coupled to the input component 110 and/or to the microphone 120 via one or more wires and/or electrical connections. In some examples, the controller 130 is coupled to the input component 110 and/or to the microphone 120 via one or more printed circuit boards (PCBs).

In this example, the controller 130 is configured to receive the image data from the input component 110. The image data may be received by the controller 130 in the form of an electrical signal that is generated by the input component 110 and transmitted to the controller 130.

In this example, the controller 130 is configured to receive audio data from the microphone 120. The audio data is based on the sound received by the microphone 120. The audio data may be received by the controller 130 in the form of an electrical signal that is generated by the microphone 120 in response to receiving the sound and transmitted to the controller 130.

The controller 130 is configured to determine, using the image data and the audio data, whether the sound received by the microphone 120 is received from the first region of the environment. In some examples, the controller 130 is configured to determine whether the sound is received from the second region of the environment. The controller 130 may be configured to determine that the sound is received from the second region on the basis of a determination that the sound is not received from the first region, or vice versa.

In some examples, the controller 130 is configured to determine a direction of arrival of the sound at the microphone 120 based on the audio data. The controller 130 may be configured to determine whether the sound is received from the first region based on the determined direction of arrival. The direction of arrival of the sound may be determined based on a time difference of arrival (TDOA) of the sound between at least two microphones of a microphone array. The time of arrival of the sound at each of the at least two microphones may be measured and used with a predetermined cross-correlation function defining the correlation between the output signals of the at least two microphones to determine the direction of arrival of the sound. Other methods for determining the direction of arrival may also be used, such as a steered response power (SRP) method. SRP methods indirectly localise a sound source by finding a candidate source location that maximises the output of a beamformer.

In some examples, the robot 100 comprises an object recognition engine. The object recognition engine may be comprised in the controller 130 or elsewhere. The object recognition engine is configured to recognise an inanimate object in one of the first and the second region of the environment based on the image data. An inanimate object is an object that is not alive. An inanimate object may or may not be capable of movement. The object recognition engine may be configured to extract features from the image data and use the extracted features to classify the inanimate object into one of a plurality of predetermined object types. The extracted features may be compared by the object recognition engine to reference features in order to classify the object. The reference features may be stored in an object recognition library. The object recognition library may be stored locally, e.g. in a memory of the robot 100, or may be stored remotely and accessed via a network interface of the robot 100. In some examples, the object recognition engine may be configured to recognise and/or classify inanimate objects based on training of the object recognition engine. Such training may comprise positive training and/or negative training. Positive training uses example images of a target object (e.g. an object of a predetermined type) in which the target object appears different and/or is presented under different conditions, for example different lighting, colour, size, orientation, viewing angle, etc., to train the object recognition engine to recognise the target object. For example, the object recognition engine may be trained to recognise televisions by providing the engine with example images of televisions. Negative training uses example images of objects that are not the target object to train the object recognition engine to recognise how the target object should not appear.

In some examples, the controller 130 is configured to identify a characteristic of an inanimate object. An example of a characteristic of an inanimate object is a type of inanimate object. Another example of a characteristic of an inanimate object is a location of the inanimate object within the environment. The location of the inanimate object may be determined relative to the location of the robot 100. The location of the inanimate object may be determined with reference to a coordinate system of the environment.

The controller 130 is arranged to process sounds received from the first region as voice commands. Sounds received from the first region are processed as voice commands on the basis that one of the first region and the second region comprises a predetermined type of inanimate object. The controller 130 is arranged to process sounds received from the second region in a different manner. For example, the controller 130 is arranged not to interpret sounds received from the second region as voice commands.

In some examples, sounds received from the first region are processed as voice commands on the basis that the first region comprises a predetermined item of furniture. An item of furniture may be a fixture, fitting or chattel. An item of furniture may be considered to be a moveable object arranged to support human activity such as sitting, eating and sleeping. The predetermined item of furniture may be an item of furniture near which a user of the robot 100 is likely to be located. The predetermined item of furniture may be, for example, a sofa, a chair, a table or a bed. Therefore, there may be a relatively high likelihood of voice commands being issued from the vicinity of the predetermined item of furniture, namely from the first region. The first region may be considered to be a plausible region of user occupation and activity. In some examples, sounds received from the first region are processed as voice commands on the basis that the second region does not comprise the predetermined item of furniture. There may therefore be a relatively low likelihood of voice commands being issued from the second region.

In some examples, sounds received from the second region are processed in the different manner on the basis that the second region comprises a predetermined acoustically active device. An acoustically active device may be an inanimate object that generates sounds. The predetermined acoustically active device may be, for example, a television, a radio, a computing device such as a telecommunication device or personal computer, a further robot, a washing machine, a dishwasher, etc. Sounds originating from an acoustically active device may compete and/or interfere with the sound of a voice command issued by a user. Sounds originating from some acoustically active devices may resemble voice commands from a user, for example if a radio or television produces or reproduces the sound of a speaking person. Such sounds are however not to be considered genuine voice commands from a user of the robot 100. Moreover, there may be a relatively low likelihood of a user being located near the predetermined acoustically active device. Therefore, there may be a relatively low likelihood of voice commands being issued from the vicinity of the predetermined acoustically active device. In some examples, sounds received from the second region are processed in the different manner on the basis that the first region does not comprise the predetermined acoustically active device.

In some examples, sounds received from the second region are processed in the different manner on the basis that the second region comprises a predetermined structural member of the environment. The structural member may comprise a sound-reflecting surface. The structural member may be, for example, a wall, a doorway, a window or a corner. The structural member may not be acoustically active, in that the structural member itself does not generate sounds, but the structural member may passively convey sounds to the robot 100, for example due to reverberation or echo of sounds originating from elsewhere. Additionally or alternatively, some structural features, such as windows, may allow sounds to pass into the environment from outside the environment. Sounds conveyed by such structural members may interfere with the sound of a voice command issued by a user in the environment. Further, there may be a relatively low likelihood of a user being located near the predetermined structural member. For example, there may be a relatively low likelihood of a user being located in a corner of a room.

In some examples, the controller 130 is arranged to process sounds received from the second region in the different manner by performing user identification or user recognition in the second region. User identification may involve detecting the presence of a user, for example by using a camera of the robot 100. User identification in the second region may be performed in response to the robot 100 receiving a sound resembling a voice command from the second region. For example, if a sound resembling a voice command is received from the second region, the controller 130 may perform user identification to determine whether a user is present in the second region. If it is determined that a user is present in the second region, the controller 130 may be configured to process a sound from the second region as a voice command.

In some examples, the controller 130 is arranged to process sounds received from the first region as voice commands without determining that the sounds are received from a user. As such, sounds received from the first region may be processed as voice commands regardless of determining whether a user is actually present in the first region. This is in contrast to known systems in which users are themselves detected and/or tracked to facilitate processing of voice commands. The first region is defined based on whether a predetermined type of inanimate object is present in the first region or the second region, and may not be defined based on whether an actual user is determined to be present in the first region. Therefore the image data representative of the region may be obtained, and the first and the second regions identified, regardless of whether or not any users are present in the environment. A region in which an issuer of voice commands is likely to be located may therefore be predicted or inferred by the controller 130. By obtaining the image data without the need for an issuer of voice commands to be present, processing of the image data may be performed separately to processing of received audio data. For example, the image data may be processed before any sounds are received and/or processed. This may reduce or avoid the need for parallel processing of image and audio data, which may be a computationally expensive task.

In some examples, the controller 130 is configured to define the first region and/or the second region. The controller 130 may be configured to define the first region and/or the second region automatically, e.g. without specific user input. In other examples, the first region and/or the second region are defined by a user or another entity. For example, a user may specify from where voice commands will and will not be issued. The user may also confirm the nature or characteristic of inanimate object(s) recognized by the robot 100.

The controller 130 is configured to output, in response to determining that the sound is received from the first region, a control signal. The control signal is for controlling the robot 100. The control signal may comprise an electrical signal operable to control one or more operations, components and/or functions of the robot 100. The control signal may be generated by the controller 130. In some examples, the controller 130 is configured to output multiple control signals.

The control signal is based on the audio data. Different control signals may be generated based on different voice commands interpreted by the controller 130 from the audio data. As such, the controller 130 may recognise a particular voice command from the audio data and generate a control signal corresponding to that voice command. The voice command may be recognised by comparing the voice command to a plurality of reference voice commands which may be stored locally or remotely. A voice command may be considered to be an instruction or command issued by means of the human voice. In some examples, a voice command comprises a question posed to the robot 100. After interpreting the voice command, the controller 130 is configured to determine how the voice command is to be actioned, for example to determine which control signal is to be output in response to the voice command.

In this example, the robot 100 includes an output component 140. The output component 140 is a component of the robot 100 that is arranged to generate one or more outputs, for example in the form of output data or signaling. The output component 140 is communicatively coupled to the controller 130. The output component 140 may comprise an interface, e.g. between the robot 100 and the environment. In some examples, the output component 140 comprises an output device. An output device comprises a piece of hardware operable to output data or signaling. The output component 140 is arranged to generate an output based on one or more received control signals from the controller 130. The generated output may be transmitted from the output component 140 of the robot 100 to the environment. The control signal output by the controller 130 based on the audio data may be operable to control the output component 140.

In some examples, the output component 140 comprises a loudspeaker. In such examples, the control signal is operable to cause the loudspeaker to output a sound. For example, the control signal may be received by the loudspeaker and converted into a sound to be output into the environment. The output component 140 may comprise an array of loudspeakers. An array of loudspeakers may be an arrangement of multiple loudspeakers. The array of loudspeakers may be arranged about a perimeter of the robot 100. The array of loudspeakers may be configured to generate a 360 degree or omnidirectional audio output. In some examples, the control signal is operable to cause the array of loudspeakers to output a directional sound. A directional sound may be produced by causing some of the array of loudspeakers not to output the sound. For example, the sound output may be directed towards the first region of the environment, namely the region from which the voice command was issued.

The sound output by the loudspeaker may vary based on the content of the voice command. In some examples, the sound output comprises an acknowledgement or confirmation that a voice command has been received and/or actioned. In some examples, the sound output comprises a greeting. In some examples, the sound output conveys information in accordance with the voice command. Such information may be generated, retrieved, accessed and/or received by the controller 130. For example, if the user instructs the robot 100 to provide a list of engagements for a given day, the controller 130 may retrieve such information via a network and/or internal storage of the robot 100, and may convey the information to the user in the form of a sound from the loudspeaker.

In some examples, the output component 140 comprises a display device. The control signal received by the output component 140 may be operable to cause the display device to output a visual output. The visual output from the display device may vary based on the voice command. The display device may comprise a display screen such as a liquid crystal display (LCD). In some examples, the display device comprises a visual display region comprising a plurality of light-emitting diodes (LEDs). The visual display region may be arranged to convey information by selectively lighting some or all of the plurality of LEDs. The information conveyed by the visual display region may vary based on the voice command.

In some examples, the output component 140 comprises an actuator. An actuator is a component of the robot 100 that is arranged to convert energy, such as electrical energy, into movement of the robot 100. The control signal output by the controller 130 may be operable to control the actuator to cause movement of the robot 100. The actuator may comprise a motor. The motor may be a direct current (DC) motor or an alternating current (AC) motor. The motor may be arranged to drive a gear member to cause at least part of the robot 100 to move.

In some examples, the robot 100 comprises a user interaction part. The user interaction part may be a part of the robot 100 with which a user interacts. The user interaction part may be moveable by the actuator based on control signals from the controller 130. For example, the control signal output by the controller 130 may be operable to control the actuator to cause rotation of the user interaction part of the robot 100. The rotation of the user interaction part of the robot 100 may be about a vertical or a horizontal axis. The actuator may cause rotation of the user interaction part such that the user interaction part faces towards the first region. By causing the user interaction part to face towards the first region, a user located in the first region may interact with the user interaction part. The user interaction part may be distinct from a further part of the robot 100. The further part may be or may form part of a base of the robot 100. The user interaction part may be configured to move relative to the further part. In some examples, the further part is configured to be stationary while the user interaction part moves. In some examples, the user interaction part is toroidal in shape. The further part of the robot 100 may be disc-shaped. A connecting part of the robot 100 may be configured to connect the user interaction part with the further part. The connecting part may be arranged on top of the further part. The connecting part may be rotatable relative to the further part. The connecting part may comprise a raised region corresponding to a hole (or opening) in the user interaction part.

In some examples, the output component 140 comprises a network interface. The network interface may enable the robot 100 to output data via one or more data communications networks. The network interface may be the same as or different from a network interface comprised in the input component 110. The control signal output by the controller 130 may be operable to cause data to be transmitted via the network interface. The data to be transmitted may be based on the voice command. In an example, a user issues a voice command comprising an instruction for the robot 100 to send an electronic mail (e-mail), and provides the robot 100 with a message to be conveyed in such an e-mail. Based on this voice command, the controller 130 outputs a control signal to enable such an e-mail to be generated and transmitted via the network interface. The network interface may comprise a radio frequency (RF) connection interface. The robot 100 may connect via the RF connection interface to a user device, for example a mobile phone, so as to communicate data with the user device. For example, one of the user device and the robot 100 may send notifications to the other of the user device and the robot 100, regarding incoming e-mail, calls, messages, social media updates, etc., in response to a voice command.

In some examples, the control signal output from the controller 130 is operable to cause the robot 100 to change from a first operating mode to a second operating mode. The first operating mode may be a sleep mode. The sleep mode may be a low-power or power-saving mode. The second operating mode may be a user interaction mode. The robot 100 may be configured to perform at least one function in the user interaction mode that it is not configured to perform in the sleep mode. Operating in the user interaction mode may use more power than operating in the sleep mode. The control signal output from the controller 130 may therefore be operable to cause the robot 100 to "wake up" based on the voice command. In some examples, the control signal is operable to cause the robot 100 to change from the user interaction mode to the sleep mode based on the voice command.

In some examples, the control signal output from the controller 130 is operable to cause the robot 100 to control one or more aspects of an environment and/or one or more further devices. Examples of aspects of the environment include lighting and heating. Examples of further devices that may be controllable by the robot 100 in response to control signals from the controller 130 include, but are not limited to, lighting devices, heating devices, ventilation devices, alarm devices, electric blinds, radios, computers and televisions. The robot 100 may be arranged to control the one or more further devices wirelessly, for example via Z-Wave®, Bluetooth® and/or Wi-Fi™ connections. Z-Wave® is a wireless communications protocol useable in home automation. The control signal output from the controller 130 may be operable to cause the robot 100 to activate and/or deactivate one or more of the further devices. The control signal output from the controller 130 may be operable to cause the robot 100 to change a configuration or parameter of one or more of the further devices, for example a volume level or lighting level. For example, the robot 100 may be configured to receive a current configuration from a further device, such as a current volume level, and control the further device such that the further device uses a different configuration, such as a higher or lower volume level. In another example, the robot 100 is configured to receive a current temperature and to control the further device such that the further device uses a higher or lower temperature. In such examples, the further device may comprise a thermostat. One or more further devices may therefore be controlled via the robot 100 based on a voice command processed by the robot 100.

In some examples, the robot 100 comprises a memory. The memory may comprise volatile and/or non-volatile memory. The memory may comprise a hard disk drive and/or or a solid state drive. The control signal output from the controller 130 may be operable to read and/or write data to the memory. In some examples, the controller 130 is configured to receive the image data and/or the audio data from the memory. For example, the input component 110 may be configured to obtain the image data and write it to the memory, prior to the controller 130 retrieving the image data from the memory. Similarly, the microphone 120 may be configured to store the audio data in the memory for retrieval by the controller 130.

In examples where the robot 100 comprises an array of microphones, the controller 130 may be arranged to process received sounds using a beamforming function of the controller 130 using the array of microphones. The controller 130 may be arranged to process a received sound using the beamforming function on the basis of the sound being received from the first region. The beamforming function may comprise one or more spatial filters to be applied to sounds received at the array of microphones. The array of microphones may be configured to be more sensitive to sounds arriving from particular directions based on the beamforming function. The beamforming function may be used to adjust or configure a beam direction of the array of microphones. The beam direction may be considered to be a sensitivity pattern of the array of microphones. The beam direction may be focused towards the first region. The beam direction may be focused away from the second region. In some examples, sounds received from the second region may be filtered out and/or attenuated by the beamforming function. In some examples, the controller 130 is configured to focus the beam direction towards a loudest sound source among multiple sound sources within the first region. By focusing the microphone array beam direction towards the first region, sound sources within the first region may be more accurately localized. The use of the beamforming function therefore facilitates a more accurate processing of voice commands. The beamforming function may be a delay sum beamforming function, although other beamforming functions may also be used.

The input component 110 may be arranged to obtain the image data in response to a predetermined trigger event.

An example of a predetermined trigger event is the expiry of a predetermined time period. For example, the input component 110 may be arranged to obtain the image data once per day, once per week, or at other predetermined time intervals.

Another example of a predetermined trigger event is the controller 130 determining that the robot 100 has moved. For example, the controller 130 may be configured to determine that the robot 100 has moved to a different and/or unknown environment, or to a different location within a same environment. The robot 100 may comprise a motion sensor, for example a gyroscope, accelerometer or angular velocity sensor. The controller 130 may be configured to determine that the robot has moved based on an output from the motion sensor. For example, the controller 130 may determine a change in the orientation of the robot 100 based on an output from an angular velocity sensor. The robot 100 may comprise a location sensor such as a Global Positioning System (GPS) sensor. The controller 130 may be configured to determine that the robot 100 has moved based on an output from the location sensor. In some examples, the robot 100 comprises a camera. The camera may be the same as or different from a camera comprised in the input component 110. The controller 130 may be configured to determine that the robot 100 has moved based on an image output from the camera, for example by analysing the image output from the camera and determining that the image output relates to a new and/or unrecognised environment. Obtaining or re-obtaining the image data when it is determined that the robot 100 has moved enables the identification of the first region and the second region to be kept up-to-date. As such, sounds may be processed as voice commands accurately even when a robot 100 is in an unknown or new environment.

A further example of a predetermined trigger event is the receipt of a predetermined voice command, which the robot 100 recognises as being the predetermined trigger event. The predetermined trigger event may be another type of audible event. Examples of other types of audible event include, but are not limited to, a predetermined noise, sound, alarm or the like.

In some examples, the controller 130 is arranged to receive image data less frequently than audio data. Audio data may be received by the controller 130 whenever the microphone 120 receives a sound from the environment. As such, voice commands may be processed and actioned promptly by the robot 100. Image data, on the other hand, may be received by the controller 130 on predefined occasions or when the controller 130 determines that previous image data may be obsolete, for example based on a determination that the robot 100 has moved to a new environment. In some examples, image data is not received by the controller 130 in a continuous manner or in real time. Relatively few computing resources may be used to capture, communicate and/or process the image data compared to a case in which image data is captured and/or processed frequently, for example in order to facilitate real-time tracking of a user's body or face. In some examples, audio data and image data are not processed in a synchronized fashion. For example, audio data relating to a first time may be processed in parallel with image data from a second, different time. In some examples, processing of image data is not performed in parallel with processing of audio data. For example, processing of the image data may be performed before processing of the audio data. This further reduces the processing requirements of the controller 130. Power consumption and/or the use of computing resources may thereby be reduced.

The controller 130 may be arranged to operate in accordance with an operating system. The operating system may comprise a layered hierarchy. Examples of operating systems include, but are not limited to, Android, Microsoft Windows, iOS and Linux.

The operating system may comprise a kernel layer. The kernel layer may be the lowest layer or base layer of the operating system. The kernel layer may be considered as the core of the operating system, and may comprise memory management programs, security settings, power management functions, etc. The kernel layer may comprise one or more hardware drivers. A hardware driver is a computer program that is arranged to control a particular type of hardware. The one or more hardware drivers may be arranged to control hardware of the input component 110 and/or output component 140 of the robot 100. For example, the one or more hardware drivers may comprise a hardware driver for a camera of the robot 100. In some examples, the one or more hardware drivers comprise a hardware driver for a microphone or array of microphones of the robot 100. In some examples, the one or more hardware drivers comprise a hardware driver for an actuator of the robot 100. In some examples, the one or more hardware drivers comprise a hardware driver for a loudspeaker or array of loudspeakers of the robot 100. In some examples, the one or more hardware drivers comprise a hardware driver for enabling a Bluetooth® communication to and/or from the robot 100. In some examples, the one or more hardware drivers comprise a hardware driver for enabling a wireless local area network (WLAN/Wi-Fi™) communication to and/or from the robot 100. In some examples, the one or more hardware drivers comprise a hardware driver for a power management unit of the robot 100. In some examples, the one or more hardware drivers comprise a hardware driver for a memory device of the robot 100.

The control signal output by the controller 130 based on the audio data may be operable to control a hardware driver of the kernel layer of the operating system of the robot 100. For example, the control signal may be operable to cause the hardware driver to activate, deactivate, change a status or configuration of, or otherwise control, a hardware device of the robot 100, based on a particular voice command. As such, the controller 130 may be configured to determine whether a received sound is to be processed as a voice command and, if it is determined that the sound is to be processed as a voice command, to control one or more hardware drivers for one or more hardware components of the robot 100 based on the content of the voice command.

The operating system may comprise a library functions layer. The library functions layer may be above the kernel layer in the operating system hierarchy. The library functions layer may comprise a set of instructions that tell the controller 130 how to handle different types of data.

The operating system may comprise an application framework layer arranged to manage basic functions such as resource allocation, switching between processes, and monitoring the physical location of the robot 100. The application framework layer may be above the library functions layer and the kernel layer in the operating system hierarchy.

The operating system may comprise an application layer. The application layer may be a top layer of the operating system hierarchy. The application layer may comprise one or more applications. The application layer may be considered to be the layer with which a user interacts. Applications may be pre-installed on the robot 100 and/or may be downloaded or installed onto the robot 100.

In some examples, the robot 100 comprises a power supply. An example of a power supply is one or more batteries. The batteries may be disposable or rechargeable. The batteries of the robot 100 may have a limited power capacity, and as such may involve recharging or replacing when the power in the batteries has run out. In some examples, the robot 100 is powered by an external power supply, for example via a connection to an electrical mains.

Figure 2:
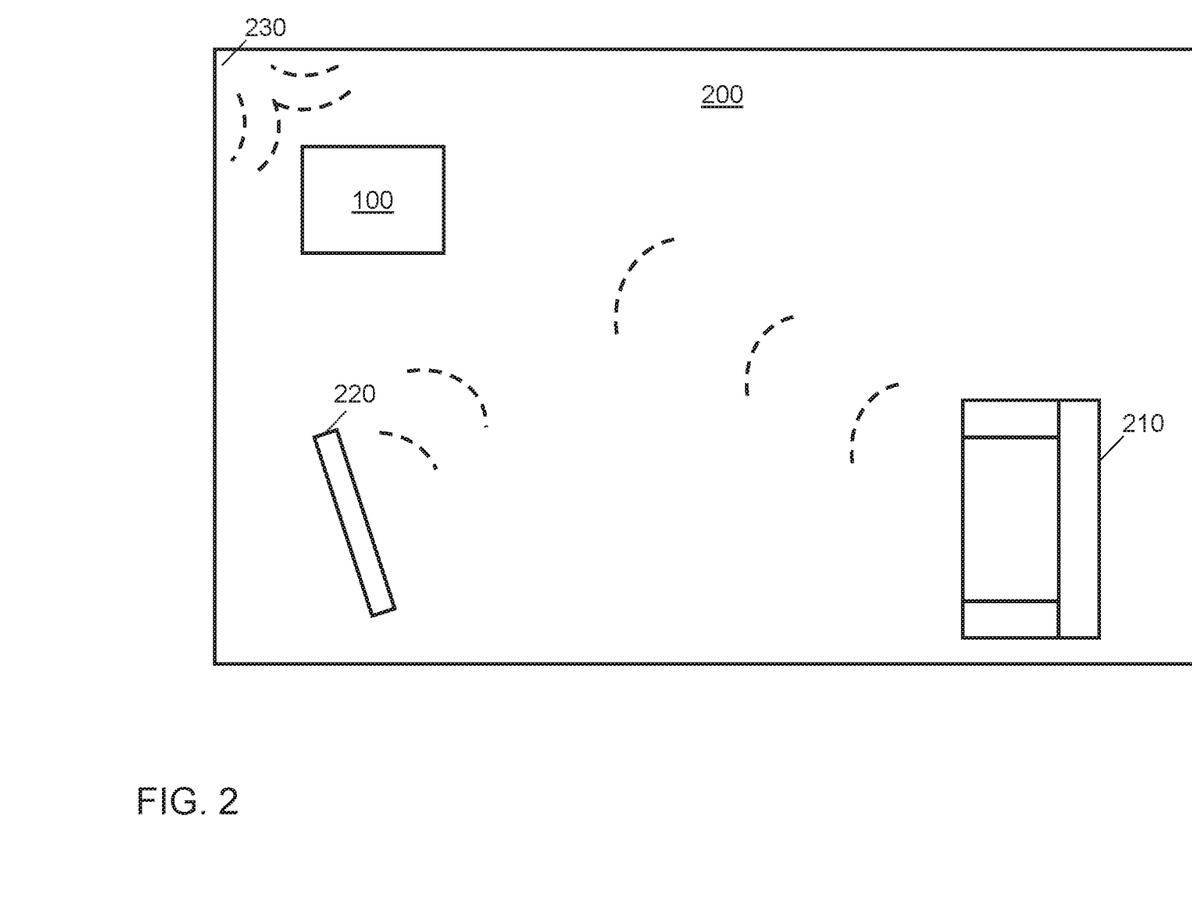
FIG. 2 shows a schematic plan view of an example of an environment in which a robot is located in accordance with an embodiment of the present invention.

Referring to FIG. 2, there is shown schematically an example of an environment 200. The environment 200 is depicted in FIG. 2 as a plan view. In this example, the environment 200 is a living room.

The living room 200 includes robot 100, as described with reference to FIG. 1 above. The robot 100 is configured to receive sounds from multiple directions and/or sources within the living room 200.

The environment 200 includes a sofa 210 and a television 220. Sofa 210 and television 220 are both examples of inanimate objects.

Sofa 210 is an example of an item of furniture near which a user of the robot 100 is likely to be located. For example, a user of the robot 100 may be seated on sofa 210 while the user interacts with the robot 100. There is therefore a relatively high likelihood of voice commands being issued from the vicinity of the sofa 210.

Television 220 is an example of an acoustically active device. As such, television 220 is a source of acoustic signals but not a source of voice commands from a user that are to be actioned by the robot 100.

The robot 100 is located near a corner 230 of the living room 200, the corner 230 comprising an intersection of two walls. The corner 230 is an example of a structural member of the environment 200. In some examples, the robot 100 is not located near a corner but is located near a wall. Walls may be considered to be sound-reflecting surfaces. Sound-reflecting surfaces may contribute to a reverberated acoustic signal. For example, sounds originating from elsewhere in the environment 200, such as from a user or from television 220, may reflect or reverberate from such sound-reflecting surfaces. As such, corner 230 may be a source of acoustic signals but not a source of voice commands from a user that are to be actioned by the robot 100.

Figure 3:
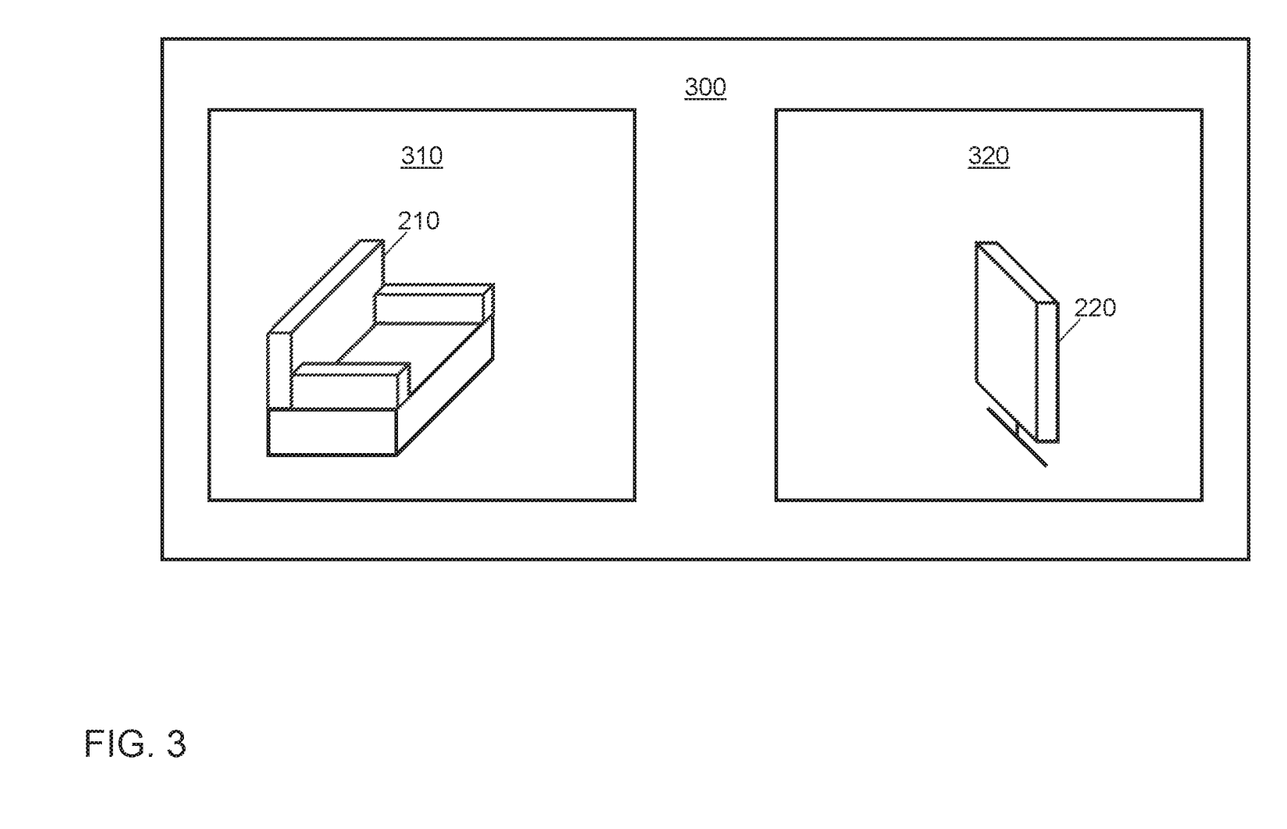
FIG. 3 shows a schematic perspective view of an example of part of the environment shown in FIG. 2.

Referring to FIG. 3, there is shown schematically a portion of the environment 200 as described with reference to FIG. 2 above. The portion of the environment 200 is depicted in FIG. 3 from the point of view of robot 100. For example, an image of the portion of the environment 200 may be captured by a camera of robot 100.

The portion of the environment 200 comprises a first region 310 and a second region 320. The first region 310 and the second region 320 may be identified by the robot 100. In some examples, the first region 310 and the second region 320 are indicated to the robot 100, for example as part of received image data.

The first region 310 comprises sofa 210. The sofa 210 may be recognised by the robot 100, for example using an object recognition engine of the robot 100. The first region 310 may be identified by the robot 100 on the basis that the sofa 210 is located in the first region 310.

The second region 320 comprises television 220. The television 220 may be recognised by the robot 100. The second region 320 may be identified by the robot 100 on the basis that the television 220 is located in the second region.

In some examples, the first region 310 is identified by the robot 100 on the basis that the television 220 is located in the second region 320 and/or that the television 220 is not located in the first region 310. In some examples, the second region 320 is identified by the robot 100 on the basis that the sofa 210 is located in the first region 310 and/or that the sofa 210 is not located in the second region 320.

The first region 310 may be considered to be a "permitted listening region". Sounds received from the first region 310 are processed as voice commands by the robot 100. The second region 320 may be considered to be a "blacklisted" region. Sounds received from the second region 320 are not processed as voice commands by the robot 100. Sounds received from the second region 320 are processed in a different manner.

In some examples, the second region 320 also comprises the corner 230. In some examples, the environment 200 comprises a third region (not shown), the third region comprising the corner 230. The third region may be considered to be another "blacklisted" region. Sounds received from the third region are not processed as voice commands by the robot 100. Sounds received by the third region are processed in a different manner.

Figure 4:
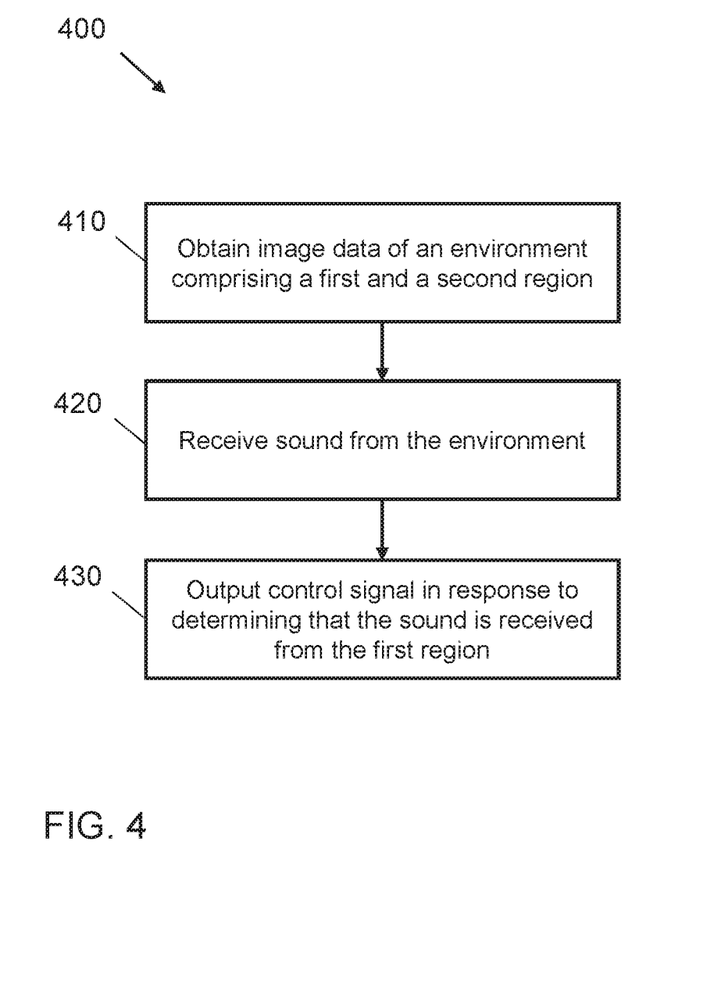
FIG. 4 shows a flow diagram depicting an example of a method in accordance with an embodiment of the present invention.

Referring to FIG. 4, there is shown schematically an example of a method 400. The method 400 may be performed by a robot comprising an input component, a microphone and a controller. In this example, the method 400 is performed by the robot 100 described with reference to FIG. 1 above.

At item 410, image data is obtained by the input component 110. The image data is representative of an environment comprising a first region and a second region. The image data is output by the input component 110 for processing by the controller 130.

At item 420, sound is received from the environment by the microphone 120. Audio data based on the received sound is output by the microphone 120 for processing by the controller 130.

At item 430, a control signal for controlling the robot 100 is output by the controller 130. The control signal is output in response to the controller 130 determining that the sound is received from the first region. The control signal is based on the audio data. The controller 130 is arranged to process sounds received from the first region as voice commands on the basis that one of the first region and the second region comprises a predetermined type of inanimate object. The controller 130 is arranged to process sounds received from the second region in a different manner, for example not as voice commands. As such, sounds may be selectively processed as voice commands based on whether the sounds are received from the first region or the second region.

Figure 5:
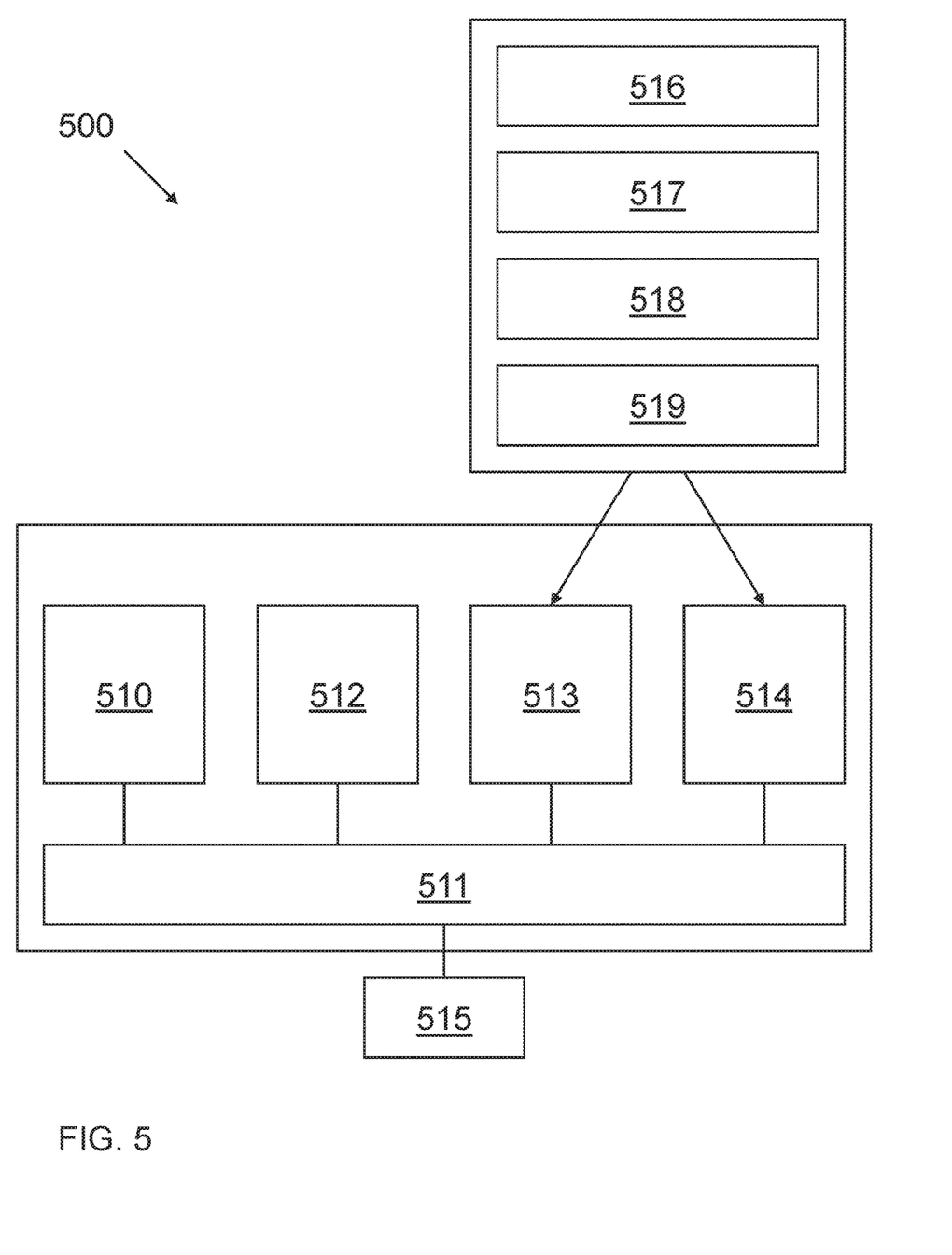
FIG. 5 shows a schematic block diagram of an example of a device in accordance with an embodiment of the present invention.

Referring to FIG. 5, there is shown a block diagram of a device 500. The apparatus is configured to process data. The device 500 may take various different forms, for example a robot.

In this example, the device 500 comprises one or more processors 510 configured to process information and/or instructions. The one or more processors 510 may comprise a central processing unit (CPU). The one or more processors 510 are coupled with a bus 511. Operations performed by the one or more processors 510 may be carried out by hardware and/or software.

In this example, the device 500 comprises computer-useable volatile memory 512 configured to store information and/or instructions for the one or more processors 510. The computer-useable volatile memory 512 is coupled with the bus 511. The computer-useable volatile memory 512 may comprise random access memory (RAM).

In this example, the device 500 comprises computer-useable non-volatile memory 513 configured to store information and/or instructions for the one or more processors 510. The computer-useable non-volatile memory 513 is coupled with the bus 511. The computer-useable non-volatile memory 513 may comprise read-only memory (ROM).

In this example, the device 500 comprises one or more data-storage units 514 configured to store information and/or instructions. The one or more data-storage units 514 are coupled with the bus 511. The one or more data-storage units 514 may for example comprise a magnetic or optical disk and disk drive.

In this example, the device 500 comprises one or more input/output (I/O) devices 515 configured to communicate information to the one or more processors 510. The one or more I/O devices 515 are coupled with the bus 511. The one or more I/O devices 515 may comprise at least one network interface. The at least one network interface may enable the device 500 to communicate via one or more data communications networks. Examples of data communications networks include, but are not limited to, the Internet, a Local Area Network (LAN) and a wide area network (WAN). The one or more I/O devices 515 may enable a user to provide input to the device 500 via one or more input devices (not shown). The one or more I/O devices 515 may enable information to be provided to a user via one or more output devices (not shown).

Various other entities are depicted for the device 500. For example, when present, an operating system 516, a control system 517, one or more modules 518, and data 519 are shown as residing in one, or a combination, of the computer-usable volatile memory 512, computer-usable non-volatile memory 513 and the one or more data-storage units 514. The data processing system 517 may be implemented by way of computer program code stored in memory locations within the computer-usable non-volatile memory 513, computer-readable storage media within the one or more data-storage units 514 and/or other tangible computer-readable storage media.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the device 500 may comprise more, fewer and/or different components from those depicted in FIG. 5.

Various measures (for example devices, methods, computer programs, computer-readable media, arrays of microphones and controllers) are provided in which a robot comprises an input component configured to obtain image data representative of an environment comprising a first and a second region. The robot also comprises a microphone configured to receive sound from the environment. The robot further comprises a controller configured to determine, using the image data and audio data derived based on the received sound, whether the sound is received from the first region. The controller is configured to output, in response to the controller determining that the sound is received from the first region, a control signal for controlling the robot. The control signal is based on the audio data. The controller is arranged to process sounds received from the first region as voice commands on the basis that one of the first region and the second region comprises a predetermined type of inanimate object. The controller is arranged to process sounds received from the second region in a different manner.

In some examples, the controller is arranged to visually detect the inanimate object using the image data. Visually detecting the inanimate object may facilitate more accurate and/or reliable object detection compared to some non-visual detection methods. Visual detection may also allow disambiguation between a greater variety of object types and/or more closely-related or similar object types compared to some non-visual detection methods.

In some examples, the robot comprises an output component, wherein the control signal is operable to control the output component in accordance with the voice command.

In some examples, the output component comprises a loudspeaker. The control signal may be operable to cause the loudspeaker to output a sound. As such, the use of a loudspeaker based on a voice command is facilitated. The conveying of information to a user via the loudspeaker based on voice commands may facilitate user interactions with the robot.

In some examples, the output component comprises a display device. The control signal may be operable to cause the display device to output a visual output. As such, the use of a display based on a voice command is facilitated. The conveying of information to a user via a display device based on voice commands may facilitate user interactions with the robot.

In some examples, the output component comprises an actuator. The control signal may be operable to control the actuator to cause movement of the robot. The use of a controllable actuator facilitates motion control of the robot based on voice commands. Controlled motion of the robot may facilitate user interactions, for example by moving the robot such that the robot faces towards a user.

In some examples, the robot comprises a user interaction part arranged to interact with a user. The control signal may be operable to control the actuator to cause rotation of the user interaction part such that the user interaction part faces towards the first region. Rotating the user interaction part such that the user interaction part faces towards the first region facilitates more meaningful user interactions with the robot. For example, the user interaction part may comprise a camera to track a user, a visual display region to convey visual information to the user, etc.

In some examples, the output component comprises a network interface. The control signal may be operable to cause data to be transmitted via the network interface. As such, data may be transmitted across a network based on a user command.

In some examples, the input component comprises an input device. As such, the image data may be obtained by hardware of the robot.

In some examples, the input device comprises an image sensor. The image sensor is arranged to detect electromagnetic radiation from the environment. Detecting electromagnetic radiation from the environment enables current information on the environment to be obtained. The electromagnetic radiation may comprise visible light. The use of visible light may provide images with a high degree of visual detail to facilitate object recognition. The electromagnetic radiation may comprise infrared. Infrared may provide depth information to facilitate the building of a spatial map of the environment.

In some examples, the input component is arranged to obtain the image data based on the controller causing at least part of the robot to rotate such that the image sensor obtains the image data, the image data representing a 360 degree spatial map of the environment around the robot. As such, more than one camera is not used to obtain a 360 degree spatial map. Using a single camera may save space, cost and/or resources in the robot.

In some examples, the input component comprises a network interface arranged to receive the image data. As such, the robot may not be required to be in the environment when the image data is received.

In some examples, the robot comprises a memory. The controller may be arranged to receive the image data and/or the audio data from the memory. As such, image data and/or audio data can be stored in the memory after being obtained. Storing the image data and/or the audio data in the memory enables the image data and/or the audio data to be processed at a later time.

In some examples, the robot comprises an object recognition engine. The object recognition engine may be arranged to recognise the inanimate object in one of the first and the second region. Using an object recognition engine facilitates the ability to distinguish between different objects, and therefore facilitates the identification of the first and the second region.

In some examples, the controller is arranged to process sounds received from the first region as voice commands on the basis that the first region comprises a predetermined item of furniture. As such, the first region may correspond to a region in which there is a high likelihood of user occupancy, and therefore a high likelihood of being a source of voice commands. By processing sounds based on items of furniture, voice commands may be processed accurately and efficiently.

In some examples, the controller is arranged to process sounds received from the second region in the different manner on the basis that the second region comprises a predetermined acoustically active device. As such, the second region may correspond to a region in which there is a low likelihood of user occupancy, and therefore a low likelihood of being a source of voice commands. Furthermore, acoustically active devices are sound sources which may compete with voice commands. Sounds received from such competing sound sources are not processed as voice commands, resulting in an accurate and efficient processing of actual voice commands.

In some examples, processing the sounds received from the second region in the different manner comprises not interpreting the sounds received from the second region as voice commands. As such, only sounds received from regions that are a plausible source of voice commands are processed as voice commands.

In some examples, the controller is arranged to determine a direction of arrival of the sound at the microphone based on the audio data. The source of the sound may therefore be localized, facilitating a comparison between the source of the sound and the first and the second regions of the environment. As such, a determination of whether the sound is to be processed as a voice command or not may be performed accurately.

In some examples, the robot comprises an array of microphones. On the basis of the sound being received from the first region, the controller may be arranged to process the sound using a beamforming function of the controller using the array of microphones. As such, an accurate audio sensitivity pattern of the environment may be obtained for the array of microphones.

In some examples, the controller is arranged to process sounds received from the first region as voice commands without determining that the sounds are received from a user. As such, tracking of users within the environment may not be involved, resulting in more efficient processing of image data and/or audio data compared to a case in which user tracking is used to process voice commands. Image data may be acquired less frequently than in known user tracking systems, and parallel processing of image data and audio data may not be involved.

In some examples, the input component is arranged to obtain the image data in response to the controller determining that the robot has moved. As such, image data may be kept up-to-date when the environment changes (or when the location of the robot within the environment changes), allowing an accurate processing of voice commands to be maintained.

Various measures (for example devices, methods, computer programs, computer-readable media, arrays of microphones and controllers) are provided in which a robot comprises a camera configured to capture an image of an environment in which the robot is located. The robot also comprises a microphone configured to receive a sound from the environment. The robot further comprises a controller configured to identify, based on the captured image, a first region of the environment and a second region of the environment. The likelihood of voice commands being issued from the first region is higher than the likelihood of voice commands being issued from the second region. At least one of the first region and the second region is identified based on a type of inanimate object located in one of the first region and the second region. The controller is further configured to send a control signal to control an output component of the robot in response to the controller determining that the sound is received from the first region.

Various measures (for example devices, methods, computer programs, computer-readable media, arrays of microphones and controllers) are provided in which a characteristic of an inanimate object in an environment is identified based on a captured image of the environment. Based on the identified characteristic, a first region of the environment and a second region of the environment are defined. One of the first region and the second region comprises the inanimate object. A sound is received from the environment, and in response to determining that the sound is received from the first region, the sound is interpreted as a voice command. The voice command is processed to generate a control signal for controlling a robot.

Various measures (for example devices, methods, computer programs, computer-readable media, arrays of microphones and controllers) are provided in which an array of microphones is configured to process acoustic signals issuing from a first region in an environment differently to acoustic signals issuing from a second region in the environment. Acoustic signals issuing from the first region are processed differently to acoustic signals issuing from the second region on the basis that one of the first and the second region comprises a predetermined type of inanimate object recognised using a captured visual representation of the environment.

Various measures (for example devices, methods, computer programs, computer-readable media, arrays of microphones and controllers) are provided in which a robot is configured to obtain a visual representation of a scene in which the robot is located, the scene comprising a fixture of a predetermined type. The robot is further configured to receive an acoustic signal and to determine a direction of arrival of the acoustic signal. The robot is further configured to process, on the basis that the fixture is located within a first region of the scene, the acoustic signal as a voice command in response to the determined direction of arrival being indicative of the acoustic signal originating from the first region. Acoustic signals originating from a second region of the scene are processed in a different manner. The robot is further configured to generate a control signal to control the robot based on the processed acoustic signal.

Various measures (for example devices, methods, computer programs, computer-readable media, arrays of microphones and controllers) are provided in which a controller is configured to receive image data representative of an environment comprising a first region and a second region. The controller is further configured to receive audio data derived based on sound received from the environment. The controller is further configured to determine, using the image data and the audio data, whether the sound is received from the first region. The controller is further configured to output, in response to the controller determining that the sound is received from the first region, a control signal for controlling operation of a robot, the control signal being based on the audio data. The controller is arranged to process sounds received from the first region as voice commands on the basis that one of the first region and the second region comprises a predetermined type of inanimate object, and is arranged to process sounds received from the second region in a different manner.

The above embodiments are to be understood as illustrative examples. Further embodiments are envisaged.

In examples described above, a robot performs an action based on a voice command from a user. In other examples, commands may be issued by a user and interpreted by the robot in other ways. For example, visual gestures performed by the user may be detected by the robot. Visual gestures may be detected by a camera of the robot. If the visual gesture is detected in the first region of the environment, the visual gesture is processed as a command. If the visual gesture is detected in the second region of the environment, the visual gesture is processed in a different manner. At least one of the first region and the second region is identified based on a type of inanimate object located in one of the first region and the second region.

In examples described above, a robot interprets voice commands from a user. In other examples, sounds other than voice commands are interpreted by the robot. For example, the robot may be configured to perform speech-to-text processing on sounds received from the first region but not on sounds received from the second region. In such an example, a controller of the robot is arranged to process sounds received from the first region using a speech-to-text processing technique on the basis that one of the first region and the second region comprises a predetermined type of inanimate object, and is arranged to process sounds received from the second region in a different manner.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A robot comprising:
an input component configured to obtain image data representative of an environment comprising a first and a second region;
a microphone configured to receive sound from the environment; and
a controller configured to:
determine, using the image data and audio data derived based on the received sound, whether the sound is received from the first region; and
output, in response to the controller determining that the sound is received from the first region, a control signal for controlling the robot, the control signal being based on the audio data,
wherein the controller is arranged to process sounds received from the first region as voice commands on the basis that a predetermined type of inanimate object is located in the first region and is arranged to process sounds received from the second region in a different manner.

2. A robot according to claim 1, wherein the controller is arranged to visually detect the inanimate object using the image data.

3. A robot according to claim 1, comprising an output component, wherein the control signal is operable to control the output component in accordance with the voice command.

4. A robot according to claim 3,
wherein the output component comprises:
a loudspeaker, and wherein the control signal is operable to cause the loudspeaker to output a sound; or
a display device, and wherein the control signal is operable to cause the display device to output a visual output.

5. A robot according to claim 3,
wherein the output component comprises an actuator, and
wherein the control signal is operable to control the actuator to cause movement of the robot.

6. A robot according to claim 5,
wherein the robot comprises a user interaction part arranged to interact with a user, and
wherein the control signal is operable to control the actuator to cause rotation of the user interaction part such that the user interaction part faces towards the first region.

7. A robot according to claim 3,
wherein the output component comprises a network interface, and
wherein the control signal is operable to cause data to be transmitted via the network interface.

8. A robot according to claim 1, wherein the input component comprises an image sensor arranged to detect electromagnetic radiation from the environment.

9. A robot according to claim 7, wherein the input component is arranged to obtain the image data based on the controller causing at least part of the robot to rotate such that the image sensor obtains the image data, the image data representing a 360 degree spatial map of the environment around the robot.

10. A robot according to claim 1, wherein the input component comprises a network interface arranged to receive the image data.

11. A robot according to claim 1,
wherein the robot comprises a memory, and
wherein the controller is arranged to receive the image data and/or the audio data from the memory.

12. A robot according to claim 1, wherein the robot comprises an object recognition engine arranged to recognise the inanimate object in the first region.

13. A robot according to claim 1, wherein the controller is arranged to process sounds received from the second region in the different manner on the basis that the second region comprises a predetermined acoustically active device.

14. A robot according to claim 1, wherein the processing of the sounds received from the second region in the different manner comprises not interpreting the sounds received from the second region as voice commands.

15. A robot according to claim 1, wherein the controller is arranged to determine a direction of arrival of the sound at the microphone based on the audio data.

16. A robot according to claim 1,
wherein the robot comprises an array of microphones, and
wherein, on the basis of the sound being received from the first region, the controller is arranged to process the sound using a beamforming function of the controller using the array of microphones.

17. A robot according to claim 1, wherein the controller is arranged to process sounds received from the first region as voice commands without determining that the sounds are received from a user.

18. A robot according to claim 1, wherein the input component is arranged to obtain the image data in response to the controller determining that the robot has moved.

19. A method of controlling a robot, the robot comprising an input component, a microphone and a controller, the method comprising:
obtaining, by the input component, image data representative of an environment comprising a first region and a second region;
outputting, by the input component, the image data for processing by the controller;
receiving, by the microphone, sound from the environment;
outputting, by the microphone, audio data based on the received sound for processing by the controller; and
in response to the controller determining, using the image data and the audio data, that the sound is received from the first region, outputting, by the controller, a control signal for controlling the robot, the control signal being based on the audio data,
wherein the controller is arranged to process sounds received from the first region as voice commands on the basis that a predetermined type of inanimate object is located in the first region, and is arranged to process sounds received from the second region in a different manner.

20. A non-transitory computer-readable storage medium comprising a set of computer-readable instructions stored thereon, which, when executed by a processing system, cause the processing system to perform a method of controlling a robot comprising an input component, a microphone and a controller, the method comprising:
obtaining, by the input component, image data representative of an environment comprising a first region and a second region;
outputting, by the input component, the image data for processing by the controller;
receiving, by the microphone, sound from the environment;
outputting, by the microphone, audio data based on the received sound for processing by the controller; and
in response to the controller determining, using the image data and the audio data, that the sound is received from the first region, outputting, by the controller, a control signal for controlling the robot, the control signal being based on the audio data,
wherein the controller is arranged to process sounds received from the first region as voice commands on the basis that a predetermined type of inanimate object is located in the first region, and is arranged to process sounds received from the second region in a different manner.

\* \* \* \* \*